United States Patent [19]
Abner

[11] 4,084,844
[45] Apr. 18, 1978

[54] DEVICE FOR CONNECTING CORRUGATED DRAINAGE TILES AND THE LIKE

[76] Inventor: Larry David Abner, R.R. 1, Norman, Ind. 47264

[21] Appl. No.: 755,152

[22] Filed: Dec. 27, 1976

[51] Int. Cl.² ............................................. F16L 21/06
[52] U.S. Cl. ................................... 285/373; 285/423; 285/DIG. 4; 285/DIG. 22
[58] Field of Search ........................................ 61/10–13; 285/407, 408, 409, 410, 373, 419, 424, DIG. 4, 177, 176, 364, 365, 366, 367, 420; 24/279, 201 C, 16 PB; 138/121, 166, 168, 97, 99; 285/423, DIG. 22, 260, 254, 37, 293

[56] References Cited

U.S. PATENT DOCUMENTS

| | | | |
|---|---|---|---|
| 3,161,210 | 12/1964 | Loof | 285/DIG. 22 |
| 3,239,254 | 3/1966 | Campbell | 285/424 X |
| 3,518,727 | 7/1970 | Eberle et al. | 24/16 PB |
| 3,633,947 | 1/1972 | Nelson | 285/DIG. 22 |
| 3,699,684 | 10/1972 | Sixt | 285/373 |
| 3,899,198 | 8/1975 | Maroschak | 285/DIG. 4 |

FOREIGN PATENT DOCUMENTS 769,622 10/1967 Canada ................................. 285/419

*Primary Examiner*—Dave W. Arola
*Attorney, Agent, or Firm*—Woodard, Weikart, Emhardt & Naughton

[57] ABSTRACT

Disclosed herein is a device for connecting corrugated drainage tiles and the like which comprises a sleeve member which fits around the adjacent ends of coaxial drainage tiles. The sleeve member includes first tabs at one end which extend from a first side of the sleeve member and are received within the external, circumferential channels in the drainage tiles. Each of the tabs defines an interior chamber which opens on the second side of the sleeve member. The other end of the sleeve member includes second tabs which are adapted to be received through the openings and within the interior chambers of the tabs on the first end of the sleeve member. The sleeve member includes several, additional tabs which are received within the external, circumferential channels of the drainage tiles. The sleeve member may thereby be positioned about the adjacent drainage tiles and the ends of the sleeve member are secured together by insertion of the second tabs into the respective interior chambers of the first tabs.

3 Claims, 3 Drawing Figures

4,084,844

DEVICE FOR CONNECTING CORRUGATED DRAINAGE TILES AND THE LIKE

BACKGROUND OF THE INVENTION

1. Field of the Invention:

The present invention relates to a device for connecting coaxial drainage tiles and the like, and more particularly to a device of this type which is especially adapted to connect corrugated drainage tiles.

2. Description of the Prior Art:

It is frequently required that coaxial pipes or tubes be joined at their adjacent ends to provide structural stability and to seal the points of connection. Field or drainage tile, for example, are conventionally used for farm drainage and are coupled together to provide a relatively long drainage conduit. It is desirable to secure the individual segments of the overall drain conduit in order to retain the coaxial alignment of the adjacent tubes, and also to prevent excessive leaking at the points of connection of the separate segments.

A number of specific devices have been devised for joining together coaxial tube sections. A typical tubing coupler comprises a band clamp which spans about the adjacent portions of the tubes and is tightened against the tubes by the operation of a lever arm. The adjacent tubes are then prevented from moving apart due to the clamp being tensioned around each of the tubes. In U. S. Pat. No. 3,964,774, issued to Wollin et al. on June 22, 1976, there is disclosed a clamp of this type which includes a lever mechanism for tightening the clamp members around adjacent annular flanges on separate tube sections. Similar clamps or couplers are disclosed in U.S. Pat. Nos. 3,276,089, issued to Cheever et al. on Oct. 4, 1966; 3,441,655, issued to Turner on April 29, 1969; 2,052,934, issued to Mire on Sept. 1, 1936; 2,501,951, issued to Lintz on Mar. 28, 1950; and, U.S. Pat. No. 1,497,141 issued to Hart on June 10, 1924. Each of the above patents discloses a tube coupler which comprises a band or other member which extends about the tubes and has opposite ends which are drawn together to provide a frictional fit of the band to the tubes.

The present invention relates to a device for coupling drainage tiles and the like which have circumferential channels, such as would exist for corrugated tubing. The clamps disclosed in the above-cited patents are generally not well suited to use with corrugated drainage tiles and the like. First, the corrugations make it more difficult for the band-type clamps to be properly positioned adjacent the two connected tubes. In addition, the band clamps do not provide for preventing axial displacement of the joined tubes other than by the frictional engagement of the band with the tubes. The present invention utilizes the existing circumferential channels on corrugated tubes to advantage by using the channels to facilitate placement of the coupling device upon the adjacent tubes and to provide resistance to axial displacement of the tubes after the device is secured thereon. In U.S. Pat. No. 3,926,222, issued to Shroy et al. on Dec. 16, 1975, there is disclosed a design for corrugated tubing which allows the tubing to be joined together without a separate coupling device. One end of the tubing is sized to fit within an end of another tube and includes a small ridge which will engage a portion of the corrugated interior of the larger tube portion. Although the corrugated tubing of the Shroy et al. patent does have certain advantages, it of course does not provide a means for joining together corrugated tubing which is not preformed in the described manner.

SUMMARY OF THE INVENTION

A device is disclosed herein for coaxially connecting drainage tiles and the like having external, circumferential channels which comprises a sleeve member having a first end and a second end, the sleeve member including a plurality of spaced apart tabs extending from one side of the sleeve member and adapted to be received within the circumferential channels in corrugated drainage tiles, and means for securing the first end of the sleeve member adjacent to the second end of the sleeve member to secure the sleeve member about corrugated drainage tiles with the tabs received within the circumferential channels of the corrugated drainage tiles. A method is also disclosed herein for coaxially connecting drainage tiles and the like which have external, circumferential channels, the method comprising the steps of placing the drainage tiles together coaxially, positioning a sleeve member to surround the drainage tiles, the sleeve member including at least one tab received within the circumferential channels of one of the drainage tiles and at least one tab received within the circumferential channels of the other of the drainage tiles, the sleeve member having a first end and further having a second end located adjacent the first end when the sleeve member is placed about the drainage tiles, and securing the first end of the sleeve member to the second end of the sleeve member.

It is an object of the present invention to provide a simple and inexpensive device for coaxially coupling corrugated drainage tiles and the like.

Another object of the present invention is to provide a device for joining together the ends of coaxial, corrugated tubes in a manner to prevent axial displacement of the tubes and to reduce the leakage of fluid through the seam between the adjacent tubes.

It is a further object of the present invention to provide a device for connecting coaxial drainage tiles and the like which may be easily and quickly installed and removed.

Further objects and advantages of the present invention will become apparent from the description of the preferred embodiment which follows.

DESCRIPTION OF THE PREFERRED EMBODIMENT

Figures 1, 2, 3:
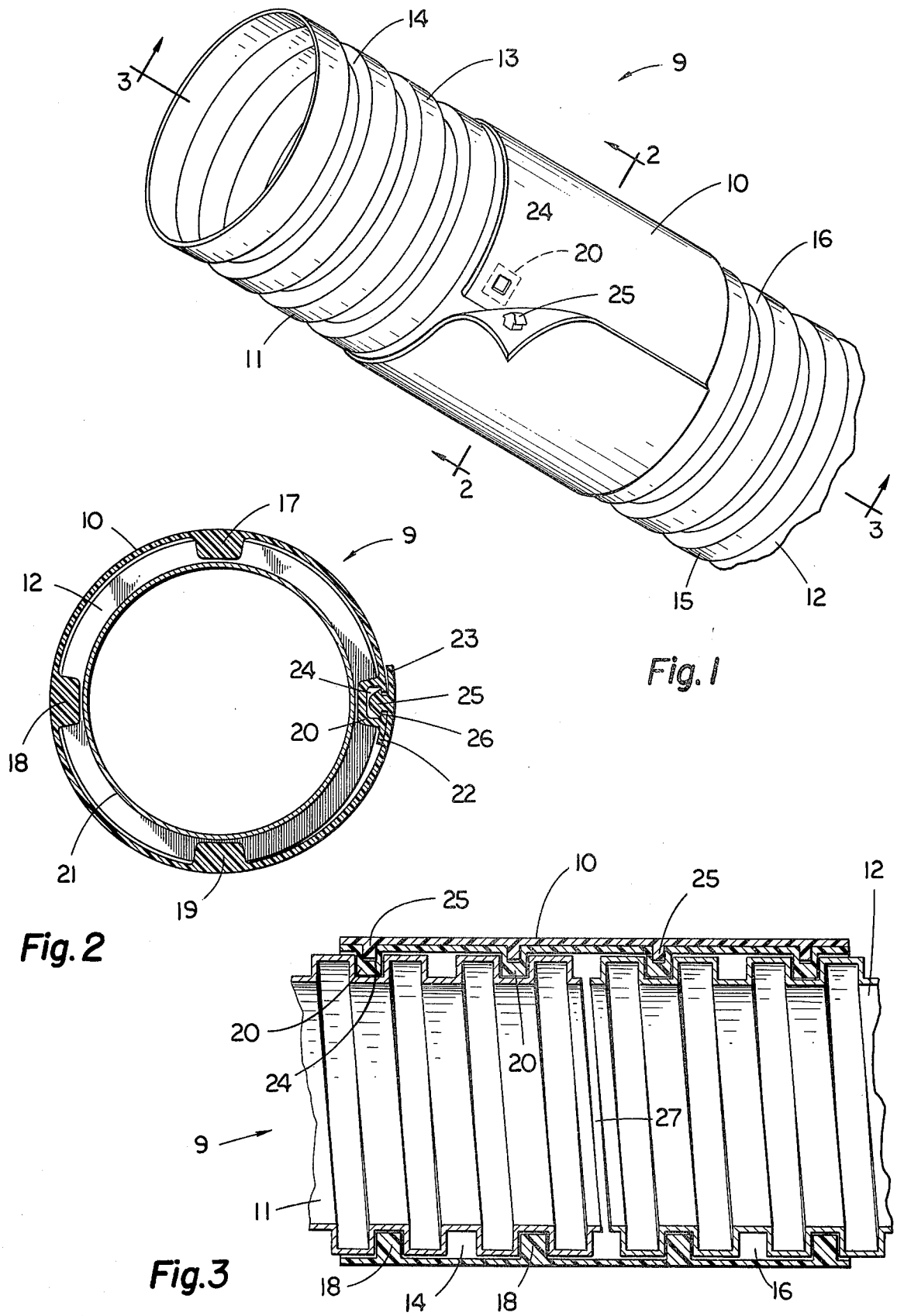
FIG. 1 is a perspective view of coaxial, drainage tiles joined together by the present invention.
FIG. 2 is a cross-sectional view of the present invention, taken along line 2—2 in FIG. 1.
FIG. 3 is a cross-sectional view of the present invention, taken along line 3—3 of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the pricinples of the invention as illustrated therein being contemplated as would normally occur to one skilled in the art to which the invention relates.

In many circumstances it is desirable to coaxially couple sections of tubing to provide a relatively long conduit. As previously related, many devices have been proposed for facilitating the coupling of adjacent tube sections. The present invention is directed at a device that is of simple construction and is easily used and which provides for coupling drainage tiles and the like having external, circumferential channels. Corrugated drainage tile, for example, falls into this class and is commonly used to provide farm drainage by laying sections of the tiles in a trench and connecting the sections together. The present invention has a particular application to the connection of drainage tile sections, and more broadly applies to a device for coupling tube sections having external, circumferential channels.

Referring now to the figures, there is shown a combination 9 of corrugated drainage tiles 11 and 12 secured coaxially by sleeve member 10 in accordance with the present invention. Drainage tiles 11 and 12 are positioned coaxially and have adjacent ends at location 27 (FIG. 3). Sleeve member 10 is positioned to surround the adjacent end portions of drainage tiles 11 and 12. As will be more fully described below, sleeve member 10 couples together the drainage tiles 11 and 12 and seals the junction of the tiles.

Drainage tile 11 includes external, circumferential channels 14 defined by spaced apart, circumferential ridges 13. Similarly, drainage tile 12 includes circumferential channels 16 defined by spaced apart ridges 15. Sleeve member 10 includes a plurality of tabs 17–20, all of which extend from the same side of sleeve member 10. Tabs 17–20 are shaped and positioned to be received within the circumferential channels 14 and 15 of drainage tiles 11 and 12, respectfully. Tabs 17–20 cooperate with ridges 13 and 15 to prevent axial displacement of drainage tiles 11 and 12 while sleeve member 10 is positioned about the drainage tiles.

Sleeve member 10 includes a first end 22 (FIG. 2) which is connected adjacent to second end 23 (FIG. 2) to secure sleeve member 10 about drainage tiles 11 and 12. The provision of these separable ends 22 and 23 permits sleeve member 10 to be readily installed upon or removed from adjacent drainage tiles without the need for separating the tiles to permit the sleeve member to be slid onto or off of one of the tiles.

Means are provided for connecting first end 22 adjacent to second end 23. This connecting means preferably incorporates some of the tabs included on the sleeve member 10, although other known securement means could be employed for this purpose. In the preferred embodiment, sleeve member 10 includes tabs 20 located adjacent to first end 22 and extending from a first side of sleeve member 10 to be received within the circumferential channels of the drainage tiles. Tabs 20 are hollow and thereby define interior chambers 24 (FIG. 2) which open out onto the second side of sleeve member 10 through openings 26. Sleeve member 10 additionally includes tabs 25 located adjacent second end 23, and positioned and shaped to be received within respective interior chambers 24 of tabs 20. As shown in FIG. 2, tabs 25 are preferably provided with enlarged head portions which are greater in size than the respective openings 26, thereby locking the tabs within the interior chambers 24 upon insertion beyond openings 26. Insertion of tabs 25 into the interior chambers 24 of the tabs 20 secures sleeve member 10 in position surrounding the adjacent ends of drainage tiles 11 and 12, thereby coupling the drainage tiles to maintain alignment of the tiles and to seal the junction or seam between the adjacent tiles.

Although a particular, preferred embodiment of the present invention has been described, various modifications of the described device could be made which would fall within the purview of the present invention. For example, tabs 17–20 are shown to be generally rectangular and spanning only a small distance of the circumference of the drainage tiles. These tabs could, however, be modified to be greater in length, and in fact, a single short tab or one which would span essentially the entire circumference of the drainage tiles could be employed. Similarly, the number and spacing of the tabs could be varied from that shown. In addition, tabs 17–20 are shown (FIG. 2) to extend into the channels but not to abut the bottoms 21 of the channels. The tabs could be made to extend more radially inward to engage the channel bottoms 21, although this is less preferred. It is preferred that sleeve member 10 include tabs received within two channels on each of the drainage tiles, although tabs being received within only one channel of each drainage tile would suffice. The material from which sleeve member 10 and tabs 17–20 and 25 are made is advantageously selected to suit the particular environment in which the device will be employed. Sleeve member 10 and tabs 17–20 and 25 are, however, preferably formed, as by molding, as an integral unit from a plastic or other material having sufficient flexibility and durability.

In accordance with the method of the present invention, tubes having external, circumferential channels are conveniently and efficiently connected by installation of a tabbed sleeve member of the described type. The drainage tiles or other tubes are first aligned coaxially with the ends being adjacent. Sleeve member 10 is then positioned to surround the drainage tiles 11 and 12 with tabs 17–20 being received within the circumferential channels 14 and 16 of the drainage tiles 11 and 12, respectfully. Second end 23 of sleeve member 10 is then connected adjacent to and overlapping first end 22 by insertion of tabs 25 within the interior chambers 24 of tabs 20.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A device for coaxially connecting drainage tiles and the like having external, circumferential channels which comprise:

a sleeve member having a first end a second end, said sleeve member including a plurality of spaced apart tabs extending from a first side of said sleeve member and adapted to be received within the circumferential channels in coaxial, corrugated drainage tiles; and means for securing the first end of said sleeve member adjacent to the second end of said sleeve member to secure said sleeve member about the corrugated drainage tiles with the tabs received within the circumferential channels of the corrugated drainage tiles, said means is for securing together the first and second ends in overlapping relation, said means including a first tab adjacent the first end of said sleeve member, the first tab extending from a first side of said sleeve member and being adapted to be received within a circumferential channel in a corrugated drainage tile, the first tab having an interior chamber including an opening at the second side of said sleeve member, said means further including a second tab adjacent the second end of said sleeve, the second tab extending from the first side of said sleeve member and adapted to be received within the interior chamber of the first tab.

2. The device of claim 1 in which the second tab has an enlarged head portion greater in size than the opening, whereby the second tab is held within the first tab when the enlarged head portion is inserted into the interior chamber beyond the opening.

3. The device of claim 1 in which said sleeve member includes a plurality of tabs spaced along the length between the first and second ends of said sleeve member and further includes a plurality of tabs spaced along the width of said sleeve member, each of the tabs being adapted to be received within circumferential channels in corrugated drainage tiles.

* * * * *